United States Patent [19]
Lee et al.

[11] Patent Number: 6,052,414
[45] Date of Patent: Apr. 18, 2000

[54] MOVING PICTURE CODING METHOD AND APPARATUS FOR LOW BIT RATE SYSTEMS USING DYNAMIC MOTION ESTIMATION

[75] Inventors: Shi-hwa Lee; Jae-seob Shin, both of Seoul, Rep. of Korea

[73] Assignee: Samsung Electronics, Co. Ltd., Kyungki-do, Rep. of Korea

[21] Appl. No.: 08/858,887

[22] Filed: May 19, 1997

Related U.S. Application Data

[63] Continuation-in-part of application No. 08/366,913, Dec. 30, 1994, abandoned.

[30] Foreign Application Priority Data

Mar. 30, 1994 [KR] Rep. of Korea ................. 94-6584

[51] Int. Cl.[7] ................. H04B 1/66; H04N 7/12; H04N 5/14
[52] U.S. Cl. ................. 375/240; 348/416; 348/699
[58] Field of Search ................. 348/402, 407, 348/413, 416, 699, 700; 382/236, 238, 244; 386/111, 109

[56] References Cited

U.S. PATENT DOCUMENTS

| | | | |
|---|---|---|---|
| 5,258,836 | 11/1993 | Murata | 348/415 |
| 5,416,522 | 5/1995 | Igarashi | 348/416 |
| 5,473,379 | 12/1995 | Horne | 348/416 |
| 5,579,054 | 11/1996 | Sezan et al. | 348/452 |
| 5,592,228 | 1/1997 | Dachiku et al. | 348/416 |
| 5,598,213 | 1/1997 | Chung et al. | 348/405 |
| 5,642,166 | 6/1997 | Shin et al. | 348/416 |

OTHER PUBLICATIONS

Tse et al, "Global Zoom/Pan Estimation and Compensation for Video Compression", IEEE, 1991, pp. 2725–2728, Jul. 1991.

Rose, "Evaluation of a Motion Estimation Procedure for Low–Frame Rate Aerial Images", IEEE, 1988, pp. 2309–2312, Aug. 1988.

Eisips et al, "Global Motion Estimation for Image Sequence Coding Applications", IEEE, pp. 186–189.

Nicholas et al, "Global Motion Identification for Image Sequence Analysis and Coding", IEEE, 1991, pp. 2825–2828, Jul. 1991.

*Primary Examiner*—Vu Le
*Attorney, Agent, or Firm*—Leydig, Voit & Mayer

[57] ABSTRACT

In a moving picture coding method and apparatus for low bit rate systems using dynamic motion estimation, a shape component of the moving object for analysis can be extracted together with a motion component, thereby reducing bit generation and reducing degradation of a reconstructed image. The shape component includes location information for a group of blocks which comprise the object for analysis. The motion component includes a displacement and a rotation angle applicable to the group of blocks.

12 Claims, 7 Drawing Sheets

MOVING PICTURE CODING METHOD AND APPARATUS FOR LOW BIT RATE SYSTEMS USING DYNAMIC MOTION ESTIMATION

This disclosure is a continuation-in-part of U.S. patent application Ser. No. 08/366,913, filed Dec. 30, 1994, abandoned.

BACKGROUND OF THE INVENTION

The present invention relates to a moving picture coding method and apparatus using dynamic motion estimation for low bit-rate systems, and more particularly, to a moving picture coding method and apparatus for low bit-rate systems using dynamic motion estimation that estimates the motion and shape of an image and encodes generated parameters.

Recently, there has been much attention directed to digital moving picture transmission techniques for low bit-rate systems. The techniques can be applied to various video broadcasting systems, for example, video telephones, video conferencing equipment, industrial inspection cameras and network television systems. Specifically, there is a prospect that various video equipment operated at a transmission rate lower than 64 Kbps is connected to an integrated services digital network (ISDN), i.e., a digital transmission network. Therefore, a moving picture coding technique applicable to systems having a transmission rate lower than 64 Kbps is becoming significant.

As for a model suggested by a moving picture experts group (MPEG), 30 frames per second is processed at a relatively high bit-rate, for example, 1.5~10 Mbps. The basic algorithm used in the MPEG system is a combination of differential pulse code modulation and a transform coding method and is for all blocks having a fixed size. However, for the case of coding at low bit-rate, for example, lower than 64 Kbps, a greater video data compression is required due to the limitation of the transmission rate, as compared with the MPEG system.

The most significant operation in low bit-rate moving picture coding is the extraction of a parameter for effectively reproducing the current image based on the previous image. Thus, emphasis is placed on coding the analyzed content through motion analysis of the changed portion. In the past, the extraction of a brightness signal change component for each block was based on blocks having a fixed size or several fixed sizes. Here, the result was coded via a transform coding method. Recently, though, studies have concentrated on an object-oriented coding method where a moving object is extracted in accordance with the edges of the object or by changes in the pixels that constitute the object, and a parameter generated by a motion analysis of the object is coded.

As for a block matching method generally employed for motion estimation in a conventional moving picture coding technique, an image is divided into blocks having a predetermined size, and movement in the x and/or y axis directions is determined as a motion vector (x, y) when the sum of absolute error is most smallest while searching for a predetermined block of the current image within predetermined ranges of the previous image. However, such a motion estimation method is applied equally, including to the portion having no changes from the previous image. Thus, a long processing time is required and image quality is degraded. In addition, since the movement of an object is usually not in regular square block units, the correct motion cannot be estimated using conventional block matching.

Accordingly, block matching is a method for reducing the data being coded, by reducing the difference between a target image and a reference image, rather than a method for estimating the correct motion.

In order to partially solve the problems of the block matching method, the size of the unit block has been reduced. Further, there have been attempts to segment a large size object into sub-blocks and to generate the motion vector by estimation of motion in the x and y axis directions with respect to each sub-block. Here, the motion of each sub-block is sought independently. Therefore, there is a limit in reducing the size and number of objects for analysis. In addition, it is hard to introduce an additional dimension of motion, for example, rotation, in such method.

It should be noted that motion and an object for analysis in a moving picture image are closely related to each other. In other words, a motion estimation process seeks the motion with respect to the object, but the motion component greatly affects the extracting of an object for analysis.

In a moving picture coding technique, the conventional motion estimation technique is independent of the motion characteristic with respect to such analysis object, and fixes one component while estimating another using the fixed component so as to extract data. Thus, a large amount of duplication exists in the extracted data, and image quality is degraded due to imprecise processing.

Meanwhile, there have been efforts to apply mathematical means to the extracting of a motion component of the object for analysis. Relatively accurate motion estimation can be achieved by such mathematical analysis when the right object for analysis is selected. However, mathematical analysis is extremely complex and difficult to implement using hardware. In addition, the mathematical analysis technique establishes a motion estimation region prior to performing the motion estimation, which causes difficulties in performing motion estimation optimally.

SUMMARY OF THE INVENTION

Accordingly, it is an object of the present invention to provide a moving picture coding method for low bit-rate systems using a motion estimation that estimates the motion and shape parameters of an object for analysis using dynamic motion analysis and codes the generated parameters via the motion estimation.

It is another object of the present invention to provide an apparatus most suitable for realizing the moving picture coding method for low bit-rate systems using dynamic motion estimation.

To accomplish the above object, there is provided a moving picture coding method in low bit-rate using a dynamic motion estimation comprising the steps of: extracting, as an object for analysis, the changed region from a target image which is the luminance information of the next image to be coded by being based on the reference image which is the luminance information of the previous image; estimating a global motion for generating motion information and shape information of the object for analysis by analyzing the global motion of the object for analysis extracted in the extracting step, and constituting a temporarily reconstructed image by employing the motion information and shape information; and estimating a block motion for analyzing block motion with respect to the target image, temporarily reconstructed image and background image constituted in the step for estimating global motion, and performing motion analysis for the region where the small motion and background existed and motion estimation could not be performed in the step for estimating global motion according to modes so as to constitute the final restored image.

There is provided a moving picture coding apparatus in low bit-rate using a dynamic motion estimation comprising: a global motion analyzer for analyzing a global motion of the object extracted from reference image and target image, and for generating motion information and shape information of the object for analysis as a first parameter; a global motion synthesizer for constituting the temporarily reconstructed image with respect to the reference image by employing the first parameter output from the global motion analyzer; a block motion analyzer for analyzing a motion with respect to a predetermined unit block by employing the target image, the temporarily reconstructed image and background image output from the global motion synthesizer, and for generating motion information and shape information of the block as a second parameter; and a block motion synthesizer for performing, by employing the second parameter output from the block motion analyzer, for the region where the small motion and background existed and motion estimation could not be performed in the global motion analyzer according to modes, so as to constitute the final restored image.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

An embodiment of the present invention will be explained with reference to the attached drawings.

Figure 1:
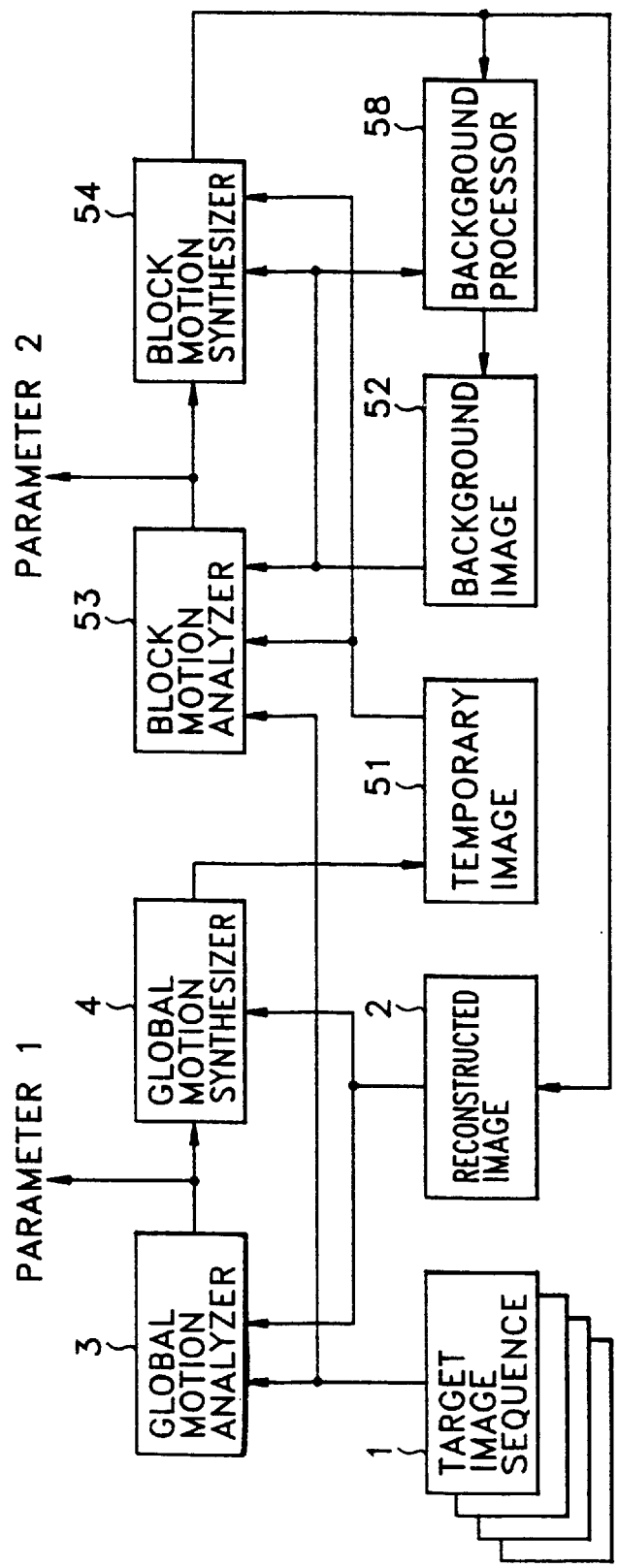
FIG. 1 is a block diagram illustrating an embodiment of a moving picture coding apparatus for low bit-rate systems using dynamic motion estimation according to the present invention.

FIG. 1 is a block diagram illustrating an embodiment of a moving picture coding apparatus for low bit-rate systems using dynamic motion estimation according to the present invention.

The apparatus shown in FIG. 1 comprises a global motion analyzer 3 for analyzing global motion of an object extracted from a target image 1 and a reconstructed image 2 and generating motion information and shape information of the object for analysis as a first parameter, a global motion synthesizer 4 for generating the temporary image 51 with respect to reconstructed image 2 using the first parameter output from global motion analyzer 3, a block motion analyzer 53 for analyzing motion of a predetermined unit block using target image 1, the temporary image 51 output from global motion synthesizer 4, and a background image 52 and for generating motion information and shape information with respect to the block as a second parameter, a block motion synthesizer 54 for performing motion analysis for the region where slight motion and background existed and motion estimation could not be performed in the global motion analyzer 3 according to a selected mode, using the second parameter output from block motion analyzer 53, and for generating a new reconstructed image 2, and a background processor 58 for correcting and managing the background image extracted from the new reconstructed image 2 output from block motion synthesizer 54.

Figure 2:
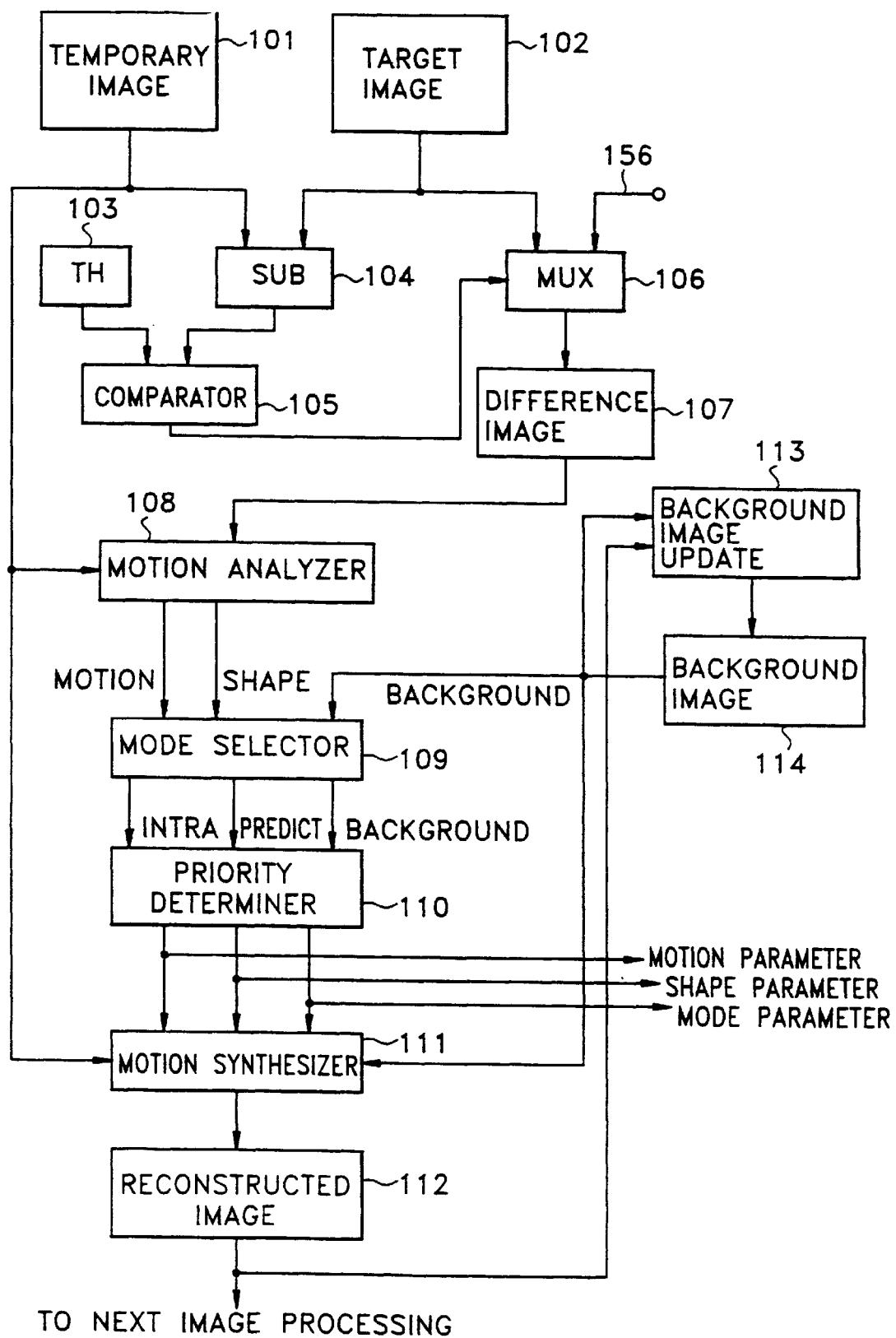
FIG. 2 is a detailed block diagram illustrating the global motion analyzer, block motion analyzer, global motion synthesizer and the block motion synthesizer shown in FIG. 1.

FIG. 2 is a detailed block diagram illustrating the global motion analyzer 3, block motion analyzer 53, global motion synthesizer 4 and the block motion synthesizer 54 shown in FIG. 1.

Referring to FIG. 2, global motion analyzer 3 and block motion analyzer 53 comprise a subtracter (SUB) 104 for performing a subtraction between pixels within a unit block with respect to target image 102 (reference numeral 1 of FIG. 1) and reference image 101 when a global motion is analyzed, and for performing a subtraction between pixels within the unit block with respect to target image 102 and temporarily reconstructed image 101 when block motion is analyzed; a comparator 105 for comparing the average value of the difference between pixels output from subtracter 104 and a predetermined threshold (TH) 103; a multiplexer (MUX) 106 for selecting, using a signal output from comparator 105 as a selection control signal, a block of target image 102 to output a difference image 107 when the average value between pixels is greater than the threshold, and for outputting all the pixel values within the unit block as zero when the average value between pixels is less than the threshold, a motion analyzer 108 for performing motion analysis with respect to difference image 107 output from multiplexer 106 and reference image or temporary image 101 to output motion information and shape information, and a mode selector 109 receiving the motion information and shape information output from motion analyzer 108 and a background image 114 as an input, for selecting an expected mode if the motion information of the object for analysis can be analyzed from the reference image when the global motion is synthesized and when a block motion is synthesized, to parameterize the motion information and shape information, and for selecting a background mode and an intra mode if the motion information of the object for analysis cannot be analyzed from the reference image when block motion is synthesized, to parameterize the selected mode.

Meanwhile, global motion synthesizer 4 and block motion synthesizer 54 comprise a priority determiner 110 for preferentially selecting the significant parameter and transferring the result in order to control a bit generation rate with respect to the parameter generated from global motion analyzer 3 and block motion analyzer 53 when parameter generation exceeds the target level, and a motion synthesizer 111 for synthesizing the parameters selected preferentially by priority determiner 110, and for outputting the temporary image 112 (reference numeral 51 of FIG. 1) when global motion is synthesized, and for outputting the final reconstructed image 112 (reference numeral 2 of FIG. 1) when block motion is synthesized.

Figure 3B:
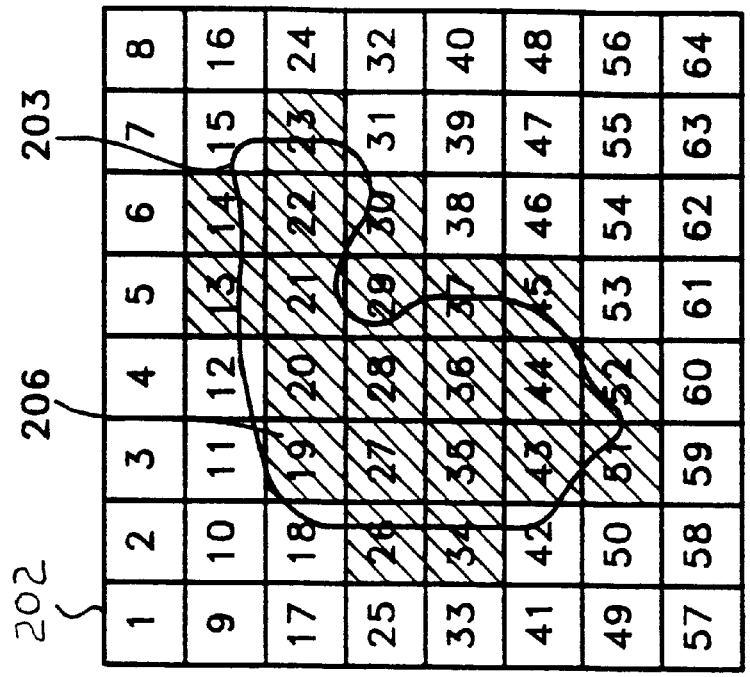
FIG. 3A and FIG. 3B illustrate examples of the motion estimation performed by the motion analyzer of FIG. 2.
Figure 3A:
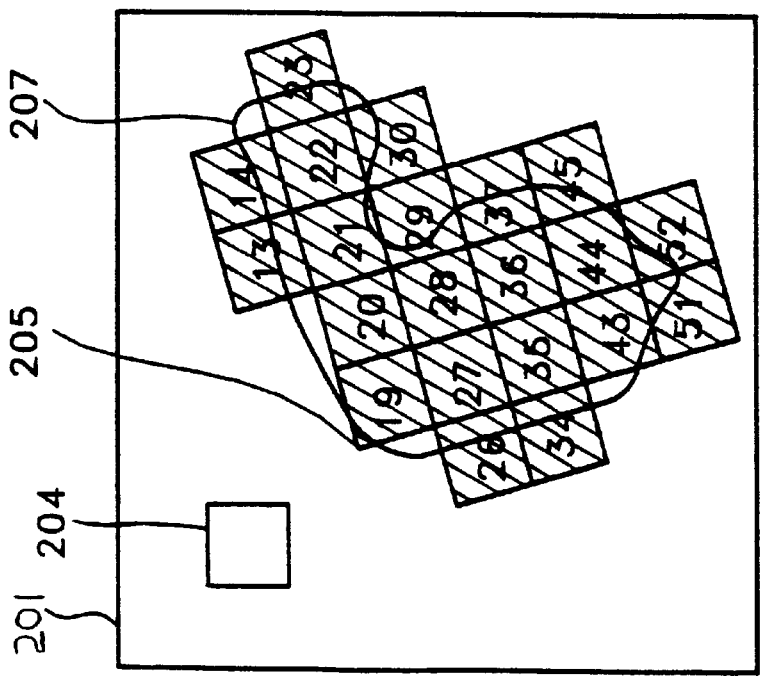

FIG. 3A and FIG. 3B illustrate examples of the motion analysis performed by motion analyzer 108 and motion synthesizer 111 of FIG. 2.

Referring to FIG. 3A and FIG. 3B, reference numeral 201 denotes a reference image, 202 denotes a target image, 203 denotes an analysis object, and 207 denotes generation of motion. Reference numeral 205 is relevant to reference numeral 206 of FIG. 3B. It is known that the analysis object 203 is rotated simultaneously with the movement in the x and y axis directions. Reference numeral 204 denotes an initial single unit block for a motion estimation, i.e., reference block. When the sum of the absolute value of the difference between pixels of the reference image and the pixels of the target image is lower than a predetermined threshold while reference block 204 is rotated at predetermined rotation angle with movement in x and y axis directions, the corresponding displacement in x and y axis directions and the rotation angle is applied to an adjacent block. It is determined whether the adjacent block is part of the analysis object. The determined block is applied again to the adjacent unprocessed block, and is applied repeatedly until there are no more blocks applicable to the displacement in the x and y axis directions and the rotation angle. The above-described process is performed continuously as the moved distance in the x and y axis directions and rotation angle are changed at regular intervals. The displacement in the x and y axis directions and the rotation angle when the number of the blocks applicable finally is maximized, are determined as a motion parameter of the object for analysis. Shapes of each adjacent block extracted in such process is determined as a shape information of the object for analysis.

Figure 4A:
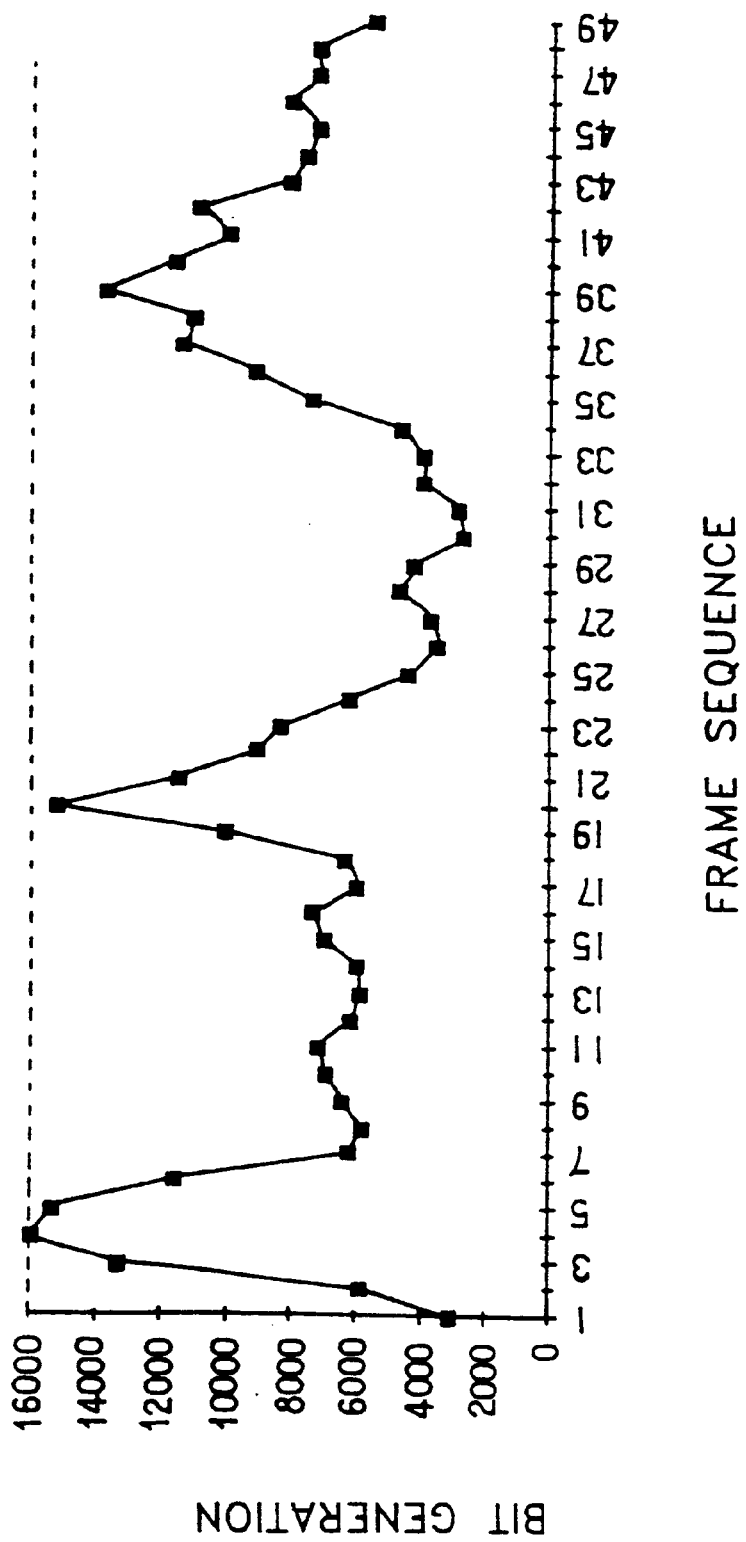
FIG. 4A and FIG. 4B illustrate the bit generation amount of the parameter resulting from two simulations.
Figure 4B:
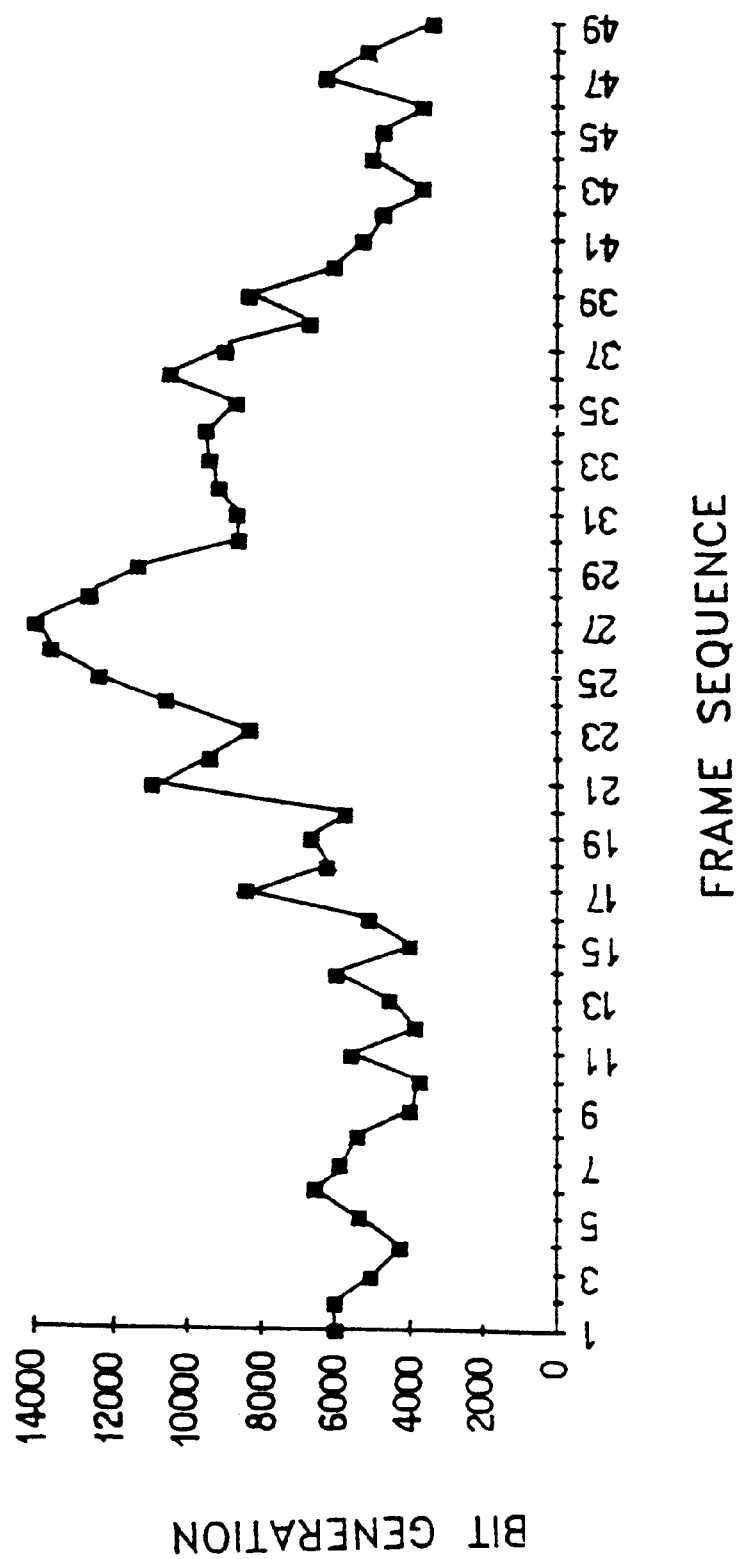
Figure 5A:
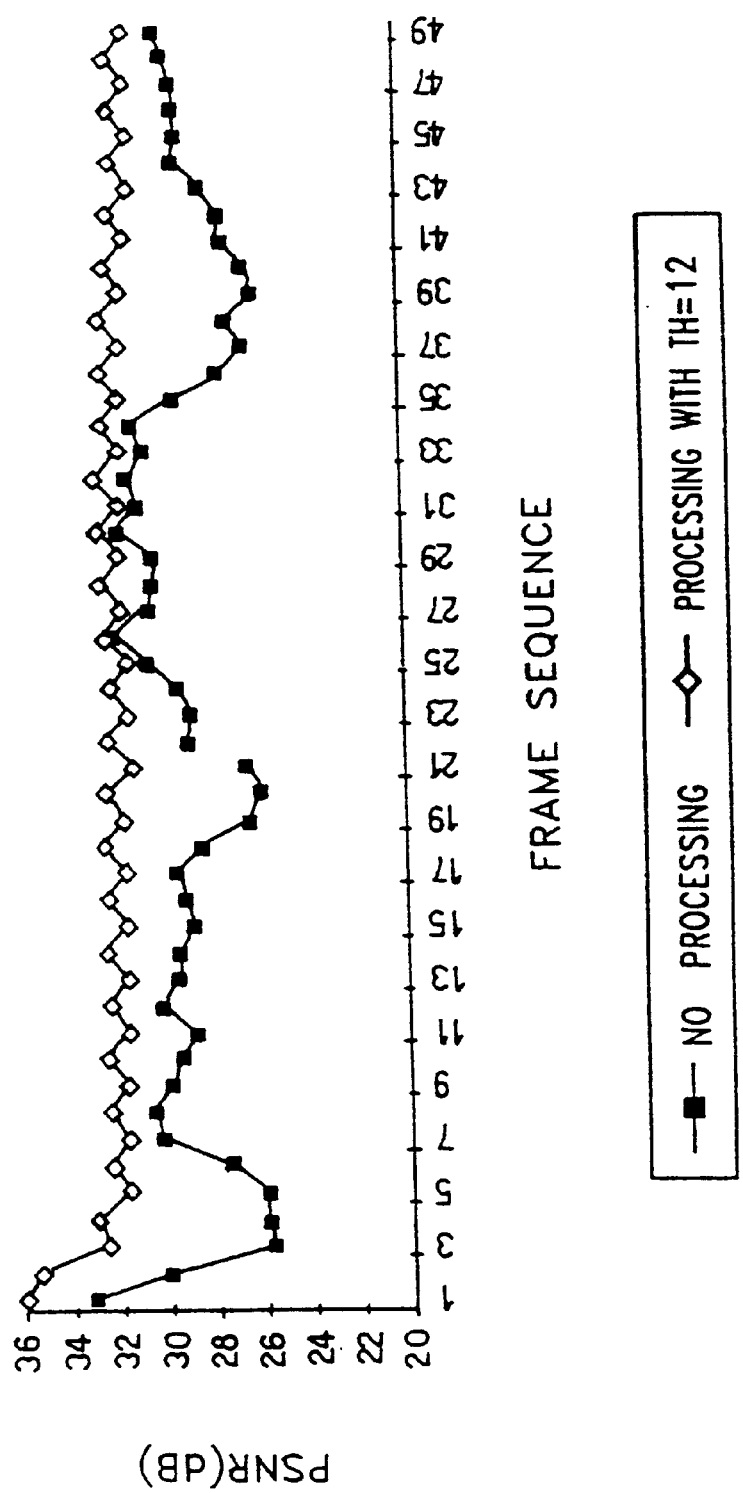
FIG. 5A and FIG. 5B illustrate the quality of the restored image generated from the result of the simulations of FIG. 4A and 4B, respectively.
Figure 5B:
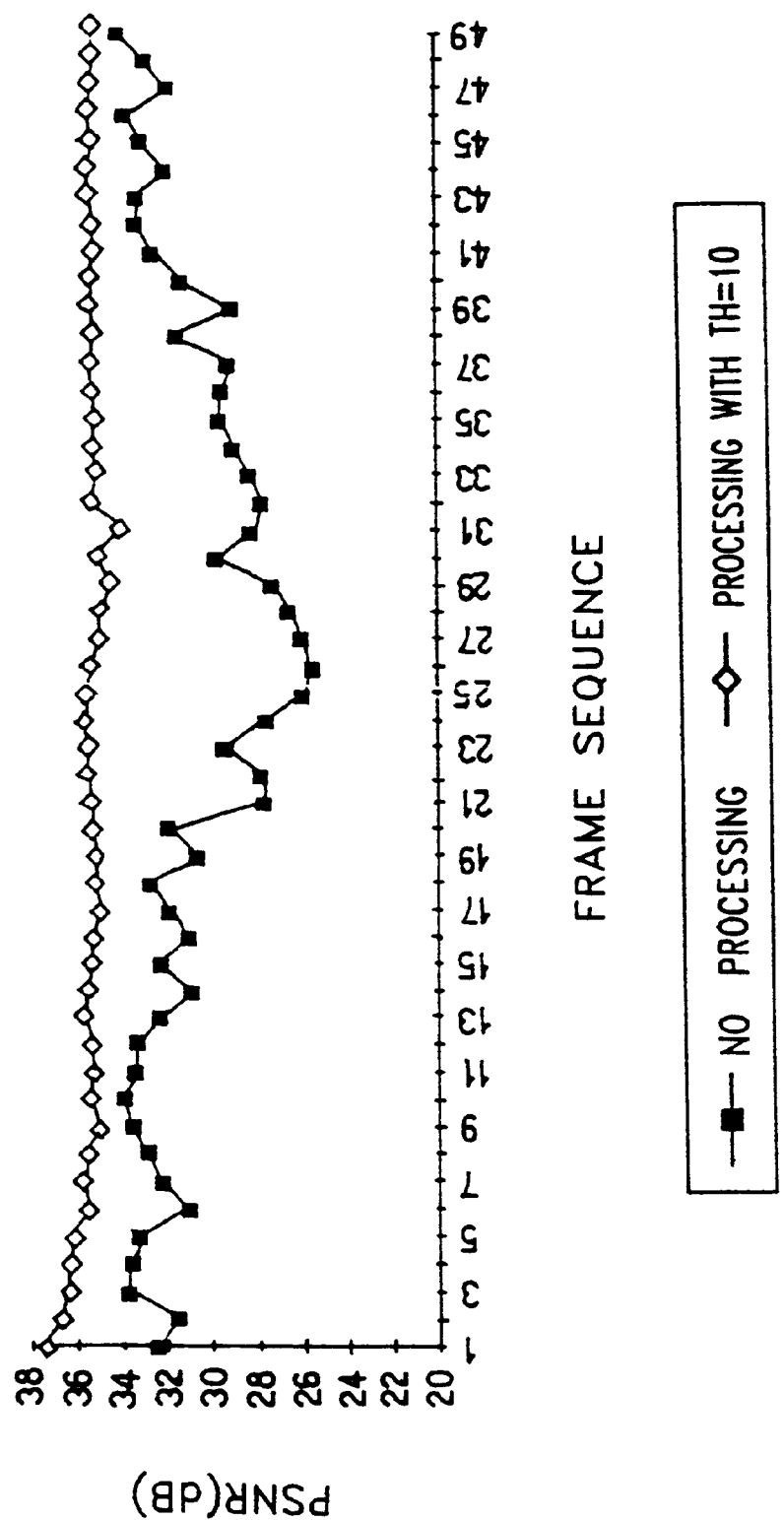

FIG. 4A and FIG. 4B illustrate the bit generation of the parameter resulting from two simulations (TH=12 and TH=10, respectively), and FIG. 5A and FIG. 5B illustrate the quality of the restored image generated from the result of the simulations of FIG. 4A and FIG. 4B, respectively, in the form of a picture signal-to-noise ratio (PSNR).

An apparatus of the present invention will be explained with reference to the attached drawings.

Referring to the two adjacent moving pictures, luminance information of the image that precedes another in time is called a reference image, and luminance information of the next image to be coded is called a target image.

The basic method of the present invention is that the region changed in a target image is extracted from a reference image, and dynamic motion analysis is performed for the extracted region to produce a motion parameter along with data relating to the extracted region, to thereby make the extracted region the same as the target image. A moving picture coding apparatus encodes the motion parameter and transmits the result. A decoder receives the transmitted parameter and constructs a new image based on the image which has been most recently reconstructed.

The moving picture coding apparatus for low bit-rate systems using dynamic motion estimation of the present invention shown in FIG. 1 is roughly divided into global motion estimators 3 and 4 and block motion estimators 53 and 54. Reference numeral 1 denotes the target images to be coded, and reference numeral 2 denotes the reference image most recently reconstructed.

Global motion analyzer 3 encodes the shape and motion of an object for analysis when the size of the object extracted from the region where motion analysis is possible is larger than a predetermined size. Then, the result, i.e., parameter 1, is output to a decoder (not shown) and global motion synthesizer 4.

Global motion synthesizer 4 employs the shape information and motion information of the object extracted from global motion analyzer 3 so as to construct a temporary image 51 based on reconstructed image 2.

Block motion analyzer 53 performs motion analysis for a region where slight motion and background exist and thus motion estimation could not be performed in the global motion analyzer 3, according to a selected mode, based on target image 1, the temporary image 51 in which the global motion is compensated, and the background image 52 which has been maintained and controlled in the process. Parameter 2 generated in block motion analyzer 53 is output to a decoder (not shown) and block motion synthesizer 54.

Block motion synthesizer 54 performs the same operation as that of global motion synthesizer 4, and constructs the new reconstructed image 2 by performing a suitable reconstruction according to a process mode of each object for analysis. The new reconstructed image 2 is sent to a background processor 58 to be used as a reference image for processing the subsequent target image. Background processor 58 corrects and manages the background image 52 according to a background image management algorithm.

Referring to FIG. 1, global motion analyzer 3 and block motion analyzer 53 can be explained in more detail with reference to FIG. 2, as follows.

First, reference image 101 corresponds to a reconstructed image 2 of FIG. 1 for the case of global motion processing, and to a temporary image 51 of FIG. 1 for the case of block motion processing. Meanwhile, target image 102 corresponds to target image 1 of FIG. 1. Subtracter 104 performs a subtraction operation between the pixels within a unit block with respect to luminance signals of reference image 101 and target image 102. The difference value generated at that time is applied to comparator 105. Comparator 105 compares output values of threshold 103 and subtracter 104 to provide a result as a selection control signal to multiplexer 106. Multiplexer 106 selects a block of target image 102 located at the same position when the average value of the difference of pixels within a block between target image 102 and reference image 101 is larger than threshold 103, and sets all the pixel values within a unit block as zero via an input terminal 156 when the average value of the difference of pixels within a block between target image 102 and reference image 101 is smaller than threshold 103 so as to exclude the pixel value from a motion analysis process. The processed unit blocks are accumulated to constitute a difference image 107. Motion analyzer 108 extracts an object for analysis by using reference image or temporary image 101 and difference image 107 as the input, and generates shape information with respect to the motion related analysis object together with the motion information estimated by unit block units.

In order to determine motion and shape information for a target image to be encoded, the motion analyzer 108 of FIG. 2 selects a block to be currently processed from the target frame as an initial block. A previous frame, such as an original frame or a reproduced image becomes a reference frame for the initial block. A full search operation is performed in the reference frame for a block which matches the initial block. The full search includes searching the reference frame in the x and y directions, rotating the initial block about the z axis, and comparing the rotated initial block to blocks in the reference frame at the corresponding x and y displacements. For each position and corresponding rotation angle, an error value is produced by comparing the compensated block, i.e., the rotated initial block, with a block in the reference frame. If the error value is smaller than a predetermined threshold value, a motion parameter that includes the x and y displacements and the rotation angle, is applied to an adjacent block. A motion compensation error is computed for the adjacent block. If the motion compensation error is smaller than a predetermined threshold, the adjacent block is classified in the same group as the initial block. The described process is repeated by varying the displacement and rotation angle until a motion parameter which contains the largest number of blocks is selected as the motion parameter to be encoded. The group of blocks which contains the largest number of blocks comprises an object for analysis.

After a group of blocks is determined, a block in the target frame which has not been processed is selected as the initial block. A second group of blocks and a second motion parameter are determined using the described process. The process is repeated until all of the blocks in the target frame are processed. In this manner, the amount of information required to encode a target frame is minimized.

The motion information output from the motion analyzer 108 is the rotation angle value and the x and y axis displacements, i.e., the motion parameter. The shape information output from the motion analyzer 108 is contour information of the object for analysis. The contour information includes the pixel values and locations of the blocks in the object for analysis. The parameter to be finally transmitted via mode selector 109 and priority determiner 110 is determined by the motion information and shape information generated by motion analyzer 108.

The global motion estimation method compensates uniform movement of a large area in an image. Global motion estimation operates in the same manner as block motion estimation. However, the threshold value for each compensation error is smaller than that of block motion estimation. Global motion synthesis is performed only when a group of blocks produced by the motion analyzer comprises at least a predetermined number of blocks.

For the case of global motion processing, mode selector 109 performs the global motion process only for the case where an object can be produced from a reference image using a predict mode only. If a group blocks output from the motion analyzer contains at least a predetermined number of blocks, global motion processing is performed. Accordingly, only the motion information and shape information of the object are parameterized in global motion processing. In other words, only the contour and the motion parameter are used to encode the group of blocks.

However, for the case of block motion processing, mode selector 109 performs more elaborate processing than the global motion processing. For example, the location and all of the pixel values for the group of blocks output from motion analyzer 108 is transmitted, along with the motion parameter, in order to encode the motion block. For the case when a motion information of the object can be estimated from the reference image, the motion information and shape information of the object are parameterized in the same manner of the global motion processing.

Meanwhile, when the motion information cannot be estimated from the reference image, for example, when there is little or no correlation between the reference image and the target image, as determined by the output from motion analyzer 108, the background mode and an intra mode are employed. For the case of the background mode, background image 114 and the unit block to be processed are compared. Then, if the result of the comparison is that the two are identical, the signal for the location within an image of unit block and the background mode is parameterized. For the case of the intra mode, motion information cannot be estimated and the process for background image 114 also cannot be performed because motion between the reference image and the target image is relatively high and there is little or no correlation between the background image and the target image. Thus, the average pixel value is generated and parameterized by making the unit block 2×2 in size. At this time, location of the unit block within an image and the average pixel values are transmitted.

Referring again to FIG. 2, priority determiner 110 controls the quantity of bit generated, and selects preferentially the significant parameter information when parameter generation is larger than a target level, and transmits the result. Motion synthesizer 111 synthesizes the parameters selected preferentially by priority determiner 110 to construct restored image 112. At this time, reconstructed image 112 becomes the temporary image (reference numeral 51 of FIG. 1) for the case of a global motion processing structure and is used as a reference image in the next block motion processing. For the case of block motion processing, reconstructed image 112 becomes the final reconstructed image (reference numeral 2 of FIG. 1) and is used as a reference image for processing the next target image. Background image update 113 is for managing background image 114 and supplying the result to mode selector 109, and is used for block motion processing.

Now, "a" method for extracting a bit generation quantity with respect to the generated motion information and shape information will be explained.

Object-oriented coding is performed on the basis of predicted coding. In other words, a parameter is generated by an elaborate motion estimation and extraction of the object for analysis from the previous image to code a target image. At this time, the shape information including position coordinates and contour chain information is coded by contour coding. When the size of the processed image is fixed and the search scope for motion analysis is limited, the number of bits allocated for the position coordinates of each object for analysis is fixed, and the motion analysis has the same results. The motion estimation is performed by the unit of an m×n-sized block. For a block where a motion estimation is impossible, an average value is transmitted in 2×2 pixel units. Thus, a bit allocation for such block can be a constant value. Accordingly, the entire quantity of bit generation can be estimated as follows:

$$b_{para} = \sum_{i}^{N} [b_{pos(i)} + b_{ch(i)} + b_{mot(i)}] + \sum_{j}^{N} \left[b_{pos(j)} + b_{mean}\left(\frac{mn}{4}\right)\right]$$

$$= \sum_{i}^{N} \left[C(i) + N(P+K) + M\left(P + \frac{Tmn}{4}\right)\right]$$

wherein N is the number of motion-estimated objects for analysis, M is the number of unit blocks where motion estimation is impossible, C(i) is the number of contour chain code bits of an object for analysis i, P is the number of position code bits of a reference point with respect to object location, K is the number of codes representing a motion, and T is the number of bits of the code representing the average value transmitted with respect to 2×2 pixels in the block where a motion estimation has failed.

For the image to be processed, if one pixel value is sampled as eight bits, the image size is 360×288, and a motion searching scope is ±15, then, P=18, K=10 and T=8 via fixed-length coding. Accordingly, the above equation can be re-expressed as follows:

$$b_{para} = \sum_{i}^{N} C(i) + 28N + M(18 + 2mn)$$

If the number of unit blocks where a motion is considered to be generated is Z, and the number of average unit blocks within an object for analysis is G, then: Z=NG+4M, wherein C(i) is correlated to G. Thus, for an estimation, we can say $$\sum_{i}^{N} C(i) = NG$$

If both m and n are 4, then, the unit block is 4×4, and if a sampling frequency of an image is 10 Hz, the quantity of bits generated can be expressed as follows:

$$b_{para}=(G+28)N+50M$$

Here, the bit generation with respect to a parameter depends on the number of average unit blocks within an object for analysis, the number of the objects for analysis, and the number of unit blocks where motion estimation is impossible.

In order to reduce bit generation with respect to a parameter, the values G, N and M have to be reduced. However, since N and G are correlated to each other, if value of one side is reduced, then the other is increased. However, reducing the value of N is more efficient than reducing the value of G. Accordingly, it is effective to reduce the number of objects for analysis while maximizing the size thereof.

The images used for simulation were sampled at a rate of ten frames per second. Illuminance component has 360×288 size, and is sampled at eight bits per pixel. The size of a color signal is 180×288. For the simulation, amount of bit generation is not controlled for each moving picture while a threshold is controlled to be suitable for 64 Kbps transmission.

As described above, a moving picture coding method and apparatus for low bit-rate systems using dynamic motion estimation can simultaneously extract a motion component for analysis of the moving object and the shape of the object, to thereby reduce bit generation and prevent a quality degradation of the reconstructed image.

In addition, more elaborate motion analysis is possible via dynamic motion estimation, and a high quality reconstructed image can be obtained in moving picture coding at a low bit-rate, for example, 64 Kbps.

Further, since global motion is estimated, the motion generated all over a large region can be searched even when the object for analysis has a brightness similar to a background. Accordingly, an image quality degradation which may occur in image processing where a single threshold is applied can be reduced.

What is claimed is:

1. A moving picture coding method for low bit-rate systems using dynamic motion estimation, the method comprising:

extracting, as an object for analysis, a changed region from a target image, which is luminance information of a next image to be coded, based on a reference image which is luminance information of a previous image;

estimating global motion of the object for analysis, including determining a motion parameter applicable to a group of blocks of the object, comprising a maximum number of blocks, determining shape information for the group of blocks, the motion parameter including a displacement and a rotation angle, the shape information including a contour of the group of blocks, and generating a temporary image using the motion parameter and the shape information; and estimating block motion with respect to the target image, a background image, and the temporary image generated in estimating global motion, including performing block motion analysis according to a selected mode for a region of the target image, and, if motion information of the object for analysis can be analyzed from the reference image when the global motion is estimated and when the block motion is estimated, parameterizing the motion information and the shape information, and, if the motion information of the object for analysis cannot be analyzed from the reference image when the block motion is estimated, parameterizing the selected mode.

2. The moving picture coding method for low bit-rate systems using dynamic motion estimation according to claim 1, further comprising correcting and managing the background image extracted from the new reconstructed image generated in estimating block motion.

3. A moving picture coding apparatus for low bit-rate systems using dynamic motion estimation, the apparatus comprising:

a global motion analyzer for analyzing global motion of an object extracted from a reference image and a target image, the object comprising a group of unit blocks including a maximum number of unit blocks to which a motion parameter can be applied, and for generating motion information comprising the motion parameter and shape information comprising a contour of the group of unit blocks as a first parameter;

a global motion synthesizer for generating a temporary image with respect to the reference image, using the first parameter output from said global motion analyzer;

a block motion analyzer for analyzing motion with respect to a unit block using the target image, a background image, and the temporary image output from said global motion synthesizer, and for generating motion information and shape information of the unit block as a second parameter; and a block motion synthesizer for performing, using the second parameter output from said block motion analyzer, motion analysis according to a selected mode, for a region of the target image and, if the motion information of the object for analysis can be analyzed from the reference image by said global motion synthesizer and the block motion can be analyzed by said block motion analyzer, parameterizing the motion information and the shape information, or, if the motion information of the object for analysis cannot be analyzed from the reference image by said block motion analyzer, parameterizing the selected mode.

4. The moving picture coding apparatus according to claim 3, wherein said global motion analyzer and said block motion analyzer comprise:

a subtractor for subtraction between pixels in a unit block, with respect to the target image and the reference image, for global motion analysis, and, with respect to the target image and the temporary image, for block motion analysis to produce an average value of a difference between the pixels;

a comparator for comparing the average value of the difference between the pixels output from said subtractor with a threshold;

a switch for selecting the target image when an average value of the difference between pixels is larger than the threshold, receiving the signal output from said comparator as a selection control signal, and for outputting a difference image, and for outputting all pixel values within a unit block as zero when the average value of the difference between pixels is smaller than the threshold;

a motion analyzer for motion analysis with respect to the difference image output from said switch and the reference image or the temporary image, and for outputting motion information and shape information; and a mode selector for selecting an expected mode if motion information of the object for analysis cannot be analyzed from the reference image when global motion is synthesized by said global motion synthesizer so that block motion is synthesized by said block motion synthesizer, receiving the motion information and the shape information output from said motion analyzer, and the background image as an input, to parameterize the motion information and the shape information, and for selecting a background mode, and for selecting an intra mode if the motion information of the object for analysis cannot be analyzed from the reference image when block motion is synthesized, to parameterize the average value of the difference between the pixels.

5. The moving picture coding apparatus according to claim 4, wherein the motion information includes a vector value with respect to displacement along the x and y axes and a rotation angle.

6. The moving picture coding apparatus according to claim 4, wherein the shape information including position coordinates of the group of blocks and the shape information is encoded via a contour coding process.

7. The moving picture coding apparatus according to claim 4, wherein the background mode is selected when the background image being managed and the unit block to be processed are compared and determined to be equal, so that the location within an image of the unit block and a background mode signal are parameterized.

8. The moving picture coding apparatus according to claim 4, wherein the intra mode is selected when motion information cannot be estimated and a process for a background cannot be performed, and an average pixel value is generated and parameterized using a unit block as a unit.

9. The moving picture coding apparatus according to claim 3, wherein said global motion synthesizer and said block motion synthesizer comprise:

a priority determiner for preferentially selecting and transmitting parameters when parameter generation exceeds a target level, in order to control bit generation rate with respect to parameters generated by said global motion analyzer and said block motion analyzer; and a motion synthesizer for synthesizing the parameters selected preferentially by said priority determiner to output a temporary image when global motion is synthesized by said global motion synthesizer and a final reconstructed image when block motion is synthesized by said block motion synthesizer.

10. The moving picture coding apparatus according to claim 9, wherein bit generation with respect to the parameter generated by said global motion synthesizer and said block motion synthesizer depends on the number of average unit blocks within an object for analysis, the number of objects for analysis, and the number of unit blocks where motion estimation is impossible.

11. A moving picture coding method for low bit-rate systems using dynamic motion estimation, the method comprising:

extracting, as an object for analysis, a changed region from a target image, which is luminance information of a next image to be coded, based on a reference image which is luminance information of a previous image;

estimating global motion of the object for analysis, including determining a motion parameter applicable to a group of blocks of the object, comprising a maximum number of blocks, determining shape information for the group of blocks, the motion parameter including a displacement and a rotation angle, the shape information including a contour of the group of blocks, and generating a temporary image using the motion parameter and the shape information; and estimating block motion with respect to the target image, a background image, and the temporary image generated in estimating global motion, including performing block motion analysis for a region of the target image where small motion and background exist, only if motion estimation could not be performed in estimating global motion, to generate a new reconstructed image.

12. A moving picture coding apparatus for low bit-rate systems using dynamic motion estimation, the apparatus comprising:

a global motion analyzer for analyzing global motion of an object extracted from a reference image and a target image, the object comprising a group of unit blocks including a maximum number of unit blocks to which a motion parameter can be applied, and for generating motion information comprising the motion parameter and shape information comprising a contour of the group of unit blocks as a first parameter;

a global motion synthesizer for generating a temporary image with respect to the reference image, using the first parameter output from said global motion analyzer;

a block motion analyzer for analyzing motion with respect to a unit block using the target image, a background image, and the temporary image output from said global motion synthesizer, and for generating motion information and shape information of the unit block as a second parameter; and a block motion synthesizer for performing, using the second parameter output from said block motion analyzer, motion analysis, for a region of the target image where small motion and background exist, only if motion estimation could not be performed by said global motion analyzer, to generate a new reconstructed image.

* * * * *